United States Patent [19]
Tomiyori et al.

[11] Patent Number: 4,674,994
[45] Date of Patent: Jun. 23, 1987

[54] POWER TRANSMISSION APPARATUS

[75] Inventors: Takashi Tomiyori, Suzurandainishi; Takahiro Senoo, Kobe, both of Japan

[73] Assignee: Mitsuboshi Belting Ltd., Kobe, Japan

[21] Appl. No.: 812,798

[22] Filed: Dec. 23, 1985

[30] Foreign Application Priority Data

Aug. 2, 1985 [JP] Japan .................................. 60-171478

[51] Int. Cl.$^4$ ......................... F16H 55/52; F16H 7/02
[52] U.S. Cl. ........................................ 474/24; 474/28; 474/33; 474/46
[58] Field of Search ..................................... 474/32–35, 474/29, 28, 46, 24

[56] References Cited

U.S. PATENT DOCUMENTS

| | | | |
|---|---|---|---|
| 2,805,583 | 9/1957 | Besel | 474/33 X |
| 2,812,666 | 11/1957 | Huck | 474/33 |
| 2,938,408 | 5/1960 | Uher | 474/28 X |
| 3,365,967 | 1/1968 | Moogk | 74/230.17 |
| 4,196,641 | 4/1980 | Vogel | 474/29 X |
| 4,276,041 | 6/1981 | Steuer | 474/243 |
| 4,473,367 | 9/1984 | Wiegelmann | 474/265 |
| 4,484,901 | 11/1984 | Toti et al. | 474/32 X |
| 4,571,217 | 2/1986 | Takano | 474/46 |

Primary Examiner—Stephen J. Novosad
Attorney, Agent, or Firm—Wood, Dalton, Phillips, Mason & Rowe

[57] ABSTRACT

A variable speed power transmission belt drive apparatus wherein a pair of asymmetric cross section drive belts are utilized in conjunction with complementary sheaves, including a pair of axially adjustably spaced outer sheaves and an intermediate sheave. The outwardly facing side faces of the intermediate sheave are substantially planar and substantially perpendicular to the axis of the shaft on which the pulley is mounted. The inwardly facing surfaces of the outer sheaves are conical and the side surfaces of the belts are complementary to the confronting faces of the sheaves. Fluid pressure structure is provided for applying substantially equal forces to the speed-adjusting sheaves in effecting the speed-adjusting operation. In the illustrated embodiment, the angled surfaces of the belts and outer sheaves extend at an angle in the range of approximately 5° to 30° to the flat center plane of the belts, and the complementary outer surfaces of the intermediate sheave and confronting, substantially planar surfaces of the belts extend at an angle in the range of approximately 0° to 5° to the center plane of the belts.

16 Claims, 4 Drawing Figures

POWER TRANSMISSION APPARATUS

DESCRIPTION

1. Technical Field

This invention relates to power transmission apparatus and in particular to belt drives utilizing an adjustable speed pulley.

2. Background Art

In one conventional form of variable speed pulley for cooperation with a power transmission flexible belt, one of the pulley sheaves is fixed to the shaft and the other confronting sheave is axially movable on the shaft. The confronting faces of the sheaves are frustoconical. The side faces of the belt are complementarily angled and a variable effective drive radius of the pulley is obtained by adjusting the axially movable sheave on the shaft toward or from the fixed pulley, whereby the belt tends to ride further outwardly or inwardly between the frustoconical faces corresponding to the direction of movement of the adjustable sheave.

Such a variable pulley has the disadvantage of changing the centerline of the belt as a function of the adjusted radius of the variable pulley.

One attempted solution to this problem has been the provision of a variable pulley structure wherein one of the confronting faces of the pulley sheaves is effectively planar perpendicular to the axis of the shaft. In such a pulley construction, the correspondingly perpendicular side edge of the belt is maintained in the plane of the radial surface of the planar sheave, thereby maintaining the centerline of the belt notwithstanding changes in the effective diameter of the adjustable pulley.

In a further modified form of conventional adjustable pulley belt drive, a pair of axially slidable sheaves are coaxially mounted on a sleeve fixed to the drive shaft and a stationary sheave is fixed to the sleeve intermediate the axially slidable sheaves. Such a construction has the advantage of utilizing two V-shaped belts to provide improved power transmission ability. However, because the axially movable sheaves of the driver and driven pulleys move in opposite axial directions relative to each other in a speed-changing operation when using the ordinary symmetrically formed V-shaped belts, the centerline of the belt inclines away from the perpendicular to the axes of the shafts. Under such conditions, the belt side faces are no longer parallel to the confronting side faces of the grooves of the pulleys, causing the belt to deflect in providing the desired frictional engagement thereof with the pulleys in the power transmission operation. Such deflection causes irregular wear of the belts and shortened useful life.

While the asymmetrical belt avoids the problem of the displacement of the centerline, it has been found that such belts cannot adequately handle transmission of relatively large power, such as in an automobile, towing drive, or agricultural combine. It has been found that such belts are insufficient in lateral rigidity to accommodate such power transmission requirements and early degradation of the compression portions of the belt has resulted.

It has further been found that the tensile cords in such asymmetrical belts are irregularly stressed in such devices, with some of the tensile cords bearing a substantially greater stress than others. Such nonuniform stress development in the tensile cords not only causes early failure of the belts, but may result in overturning of the belt in operation.

DISCLOSURE OF INVENTION

The present invention solves the problems of the prior art variable speed belt drives discussed above in a novel and simple manner.

More specifically, the present invention comprehends an improved variable speed belt drive system wherein variably spaced sheaves of the variable drive pulley are uniformly concurrently urged toward an intermediate sheave member, with a pair of asymmetric drive belts trained about the pulley therebetween.

A second pulley of the drive system, in the illustrated embodiment, utilizes spring-biased sheaves for adjustment of the drive relationship with the pair of belts trained thereabout to cooperate with the adjustable speed pulley, providing an improved, long-life, trouble-free variable speed drive system.

The invention comprehends the provision of such a belt drive system utilizing asymmetric belts effectively maintaining the centerline of the belts in a preselected disposition notwithstanding adjustment of the variable spaced sheaves of the variable drive pulley.

The present drive system permits high loads to be transmitted without overturning of the belts and with minimum wear and maximum troublefree life.

The drive system of the present invention utilizes a pair of belts reducing the load on each of the individual belts, while yet permitting the drive system to transmit high loads.

In the illustrated embodiment, each belt is defined by a first planar side face extending substantially perpendicularly to the transverse extent of the belt, and an opposite planar side surface extending angularly to the transverse extent thereof.

In the illustrated embodiment, the power transmission apparatus further includes a variable speed pulley for power transfer relative to the belts about a rotation axis, the pulley including a pair of axially outer sheaves defining inner conical surfaces and an intermediate sheave defining axially outwardly facing substantially planar opposite surfaces confronting one each the conical surfaces of the outer sheaves.

Means are provided for urging the outer sheaves concurrently coaxially inwardly toward the intermediate sheave with the drive belts received therebetween, so that the side surfaces are disposed in facial engagement with the confronting complementary respective conical and planar surfaces of the sheaves.

A second pulley of the drive system includes spring-biased sheaves urging the belts toward an intermediate sheave defining outwardly facing, substantially planar side surfaces.

In the illustrated embodiment, the outer sheaves of the variable speed pulley are urged toward the intermediate sheave by fluid pressure means acting concurrently on both sheaves.

The belt drive system of the present invention effectively maintains a preselected centerline of the belts over a wide range of adjustments of the variable speed pulley.

The power transmission apparatus of the present invention is extremely simple and economical of construction, while yet providing the highly desirable advantages and features discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
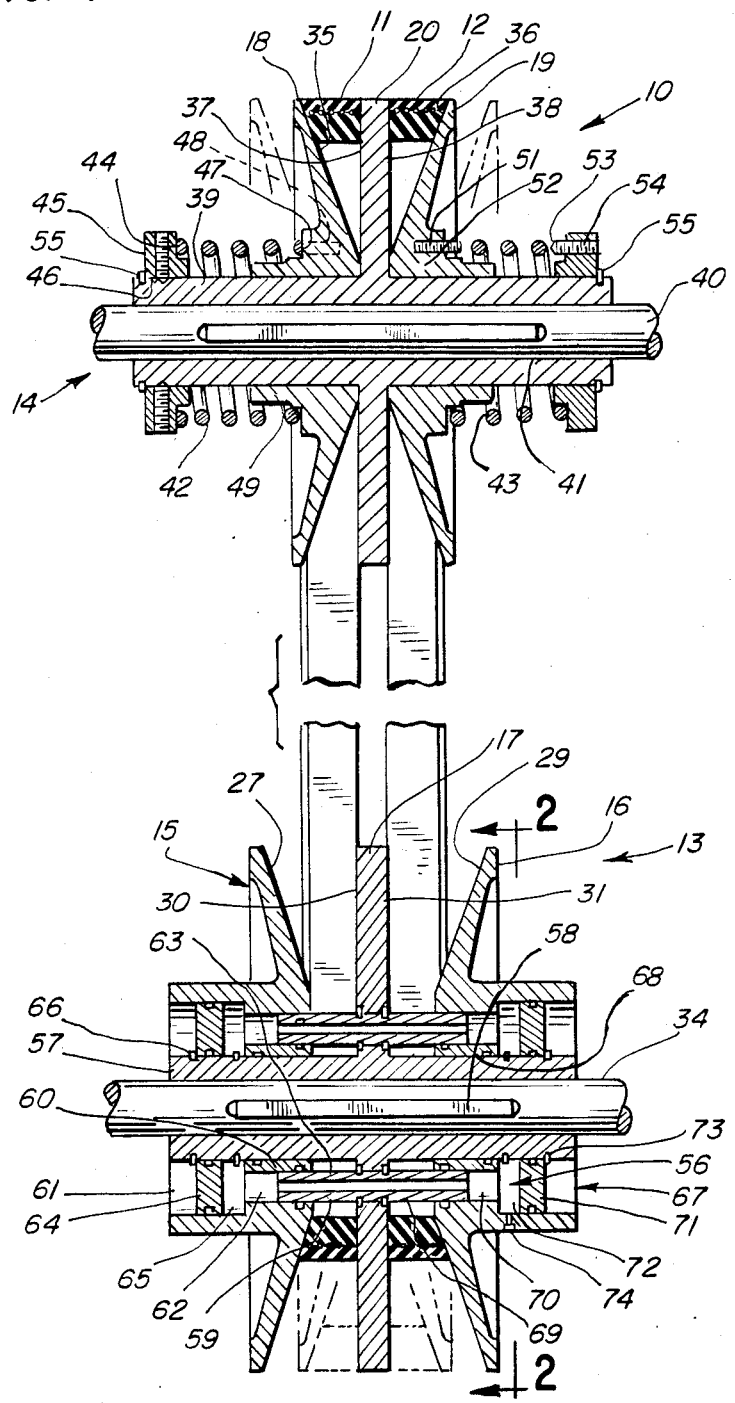
FIG. 1 is a fragmentary sectional view illustrating a variable speed power transmission apparatus embodying the invention.

In the illustrative embodiment of the invention as disclosed in the drawing, a variable speed power transmission apparatus generally designated 10 is shown to include a pair of asymmetric drive belts 11 and 12, a variable speed, first pulley generally designated 13, and an adjustable, second pulley generally designated 14.

The adjustable speed pulley 13 utilizes a pair of outer opposed sheaves 15 and 16, and an intermediate sheave 17.

The second pulley, in the illustrated embodiment, utilizes a pair of outer sheaves 18 and 19, and an intermediate sheave 20. Belts 11 and 12, as illustrated, are entrained about the two pulleys to provide a power transmission drive wherein adjustment of the spacing between the sheaves 15 and 16 of the adjustable speed pulley 13 provides for selective speed control of the drive system.

Figure 3:
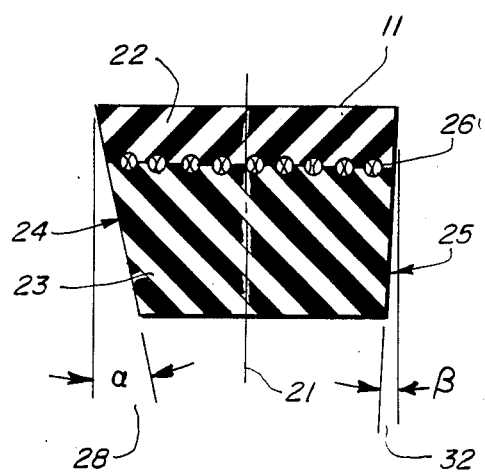
FIG. 3 is a transverse section of a power transmission belt for use in the power transmission apparatus of the invention.
Figure 4:
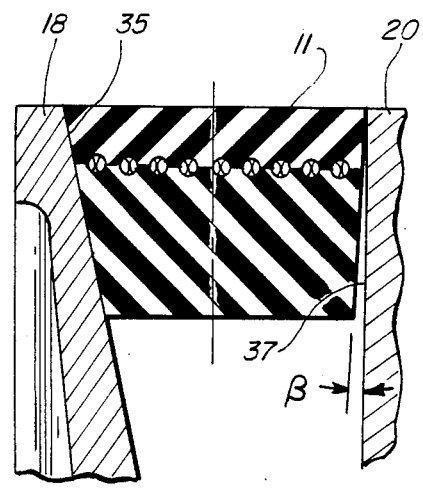
FIG. 4 is a fragmentary transverse section illustrating the driving association between the belt and the confronting pulley sheave faces.

Referring more specifically to FIGS. 3 and 4, each of the power transmission belts is asymmetrical about its longitudinal center plane 21. More specifically, each belt defines an outer tension portion 22, an inner compression portion 23, and opposite, outwardly facing side surfaces 24 and 25. The belt may be provided with a plurality of longitudinally extending tensile cords 26 of conventional construction.

As shown in FIG. 3, the wedge cross section of the belt is asymmetrical and, more specifically, surface 24 extends at an angle $\alpha$ to the center plane 21 in the range of approximately 5° to 30° thereto. The opposite side surface 25 is substantially parallel to the center plane 21, although in the preferred embodiment, the surface is angled slightly thereto and preferably at an angle $\beta$ in the range approximately 0° to 5° thereto.

Sheave 15 defines an inner, frustoconical belt-engaging surface 27 which is preferably disposed at the same angle 28 as belt surface 24, and sheave 16 defines a frustoconical, inner belt-engaging surface 29 which is disposed reversely at the same angle 28. Intermediate sheave 17 defines outwardly facing, opposite surfaces 30 and 31 which are disposed at the same angle 32 of belt surface 25.

Thus, as seen in FIG. 1, the belts 11 and 12, when entrained about the pulley 13, have their respective side surfaces facially engaged with the corresponding frustoconical and substantially planar side surfaces of the sheaves 15, 16 and 17 for providing improved frictional power transmission therebetween.

As a result of the substantial parallel relationship of the belt surfaces 25 and intermediate sheave surfaces 30 and 31 to the center plane of the belts, adjustment of the axial spacing between the sheaves 15 and 16 maintains the center plane of the belts in the same position, while the belt merely moves radially inwardly or outwardly relative to the axis 33 of the shaft 34 on which the pulley 13 is mounted, as illustrated in FIG. 1.

Sheaves 18 and 19 of pulley 14 are similarly provided with inwardly facing frustoconical belt-engaging surfaces 35 and 36, respectively, and intermediate sheave 20 of pulley 14 is provided with outwardly facing opposite surfaces 37 and 38 similar to surfaces 30 and 31 of intermediate sheave 17 of variable speed pulley 13.

In the illustrated embodiment, intermediate sheave 20 is formed integrally with a tubular sleeve 39 fixed to a shaft 40 by a key 41. Sheaves 18 and 19 are coaxially slidably mounted on the sleeve 39 at opposite sides of the intermediate sheave 20 and are resiliently retained against rotation on the sleeve by a pair of coaxial coil spring 42 and 43. The outer end of spring 42 is retained against rotation by abutment of its end portion 44 with a spring retainer 45 fixedly secured to the sleeve 39 by screw 46. The inner end 47 of spring 39 is engaged with a stop 48 secured to the hub 49 of sheave 18. Similarly, the inner end 50 of spring 43 engages a stop 51 on the hub portion 52 of sheave 19 and the outer end 53 of the spring 43 engages a spring retainer 54 fixed to the sleeve 39.

The spring retainers 45 and 54 are restrained against axially outward movement from the sleeve by suitable stop rings 55 at the opposite ends of the sleeve, as illustrated in FIG. 1. The springs engage the respective stops in such a manner as to cause the springs to unwind as a result of increased torque being applied to the sheaves 18 and 19 in the operation of the drive system. Thus the resilient retention of the sheaves against rotation on the sleeve provides an improved force transfer between the belts and sheaves in reducing shock loading and the like.

Figure 2:
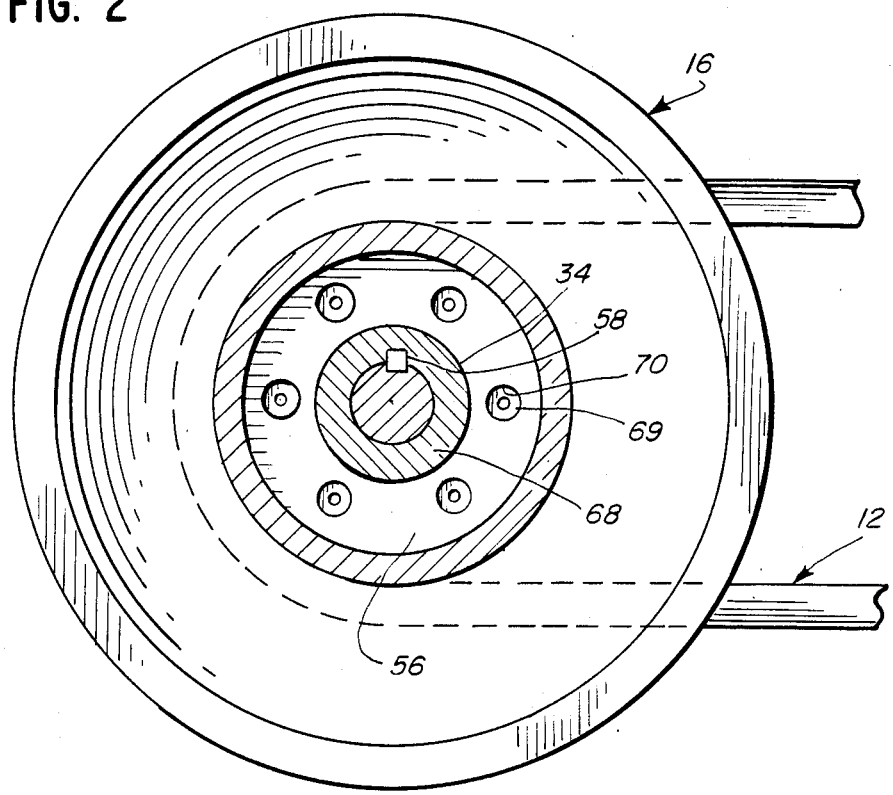
FIG. 2 is a sectional view taken substantially along the line 2—2 of FIG. 1.

The axial adjustment of sheaves 15 and 16 is effected herein by means of a fluid pressure means generally designated 56. More specifically, as illustrated in FIGS. 1 and 2, intermediate sheave 17 is formed integrally with a tubular sleeve 57 fixed against rotation coaxially to shaft 34 by a key 58. An annular array of pressure transfer tubes 59 is provided concentrically of sleeve 57 in the radially extending sheave 17.

Hub 60 of sheave 15 is provided with a plurality of through bores 61. Each bore includes a small diameter, inner end 62 slidably receiving the outer end 63 of the tube 59. A sealing closure 64 is secured in an outer, enlarged end portion 65 of bore 61 and is retained against axially outward displacement from the bore by a stop ring 66.

Sheave 16 is provided with a similar corresponding array of through bores 67 in the hub portion 68 thereof and the opposite end 69 of the tubes 59 is slidably received in a small diameter inner portion 70 of the bore 67. The bore is closed by means of a closure 71 in an enlarged diameter outer portion 72 of the bore, which is retained against axial outward displacement from the bore by means of a locking ring 73.

A fluid pressure inlet 74 is provided opening to bore portion 72 for delivering fluid, such as gaseous or liquid fluid, under pressure to the bore 67 inwardly of the closure 71. The fluid pressure passes through the tubes 59 into the inner closed portion of the bore 61 of the sheave 15 so that equalized fluid pressure is applied acting inwardly against the hub portions 60 and 68 of the sheaves 15 and 16, respectively, thereby controlledly urging the sheaves toward the intermediate sheave 17 and thereby controlling the spacing of the drive surfaces 27 and 29 and correspondingly the effective diameter of the variable speed pulley 13. Suitable seals may be provided for preventing leakage of the pressurized fluid, as illustrated in FIG. 1.

Thus, the tubes 59 serve the dual function of retaining the sheaves against rotation on the sleeve 57 and equalizing the forces acting on sheaves 15 and 16 to assure similar positioning of the two belts 11 and 12 radially of shaft 34 in the different speed-adjusting positions thereof. Further, by means of the equalized fluid pressure force means, the frictional engagement between the belts and the respective sheaves is similar, notwithstanding variations in the width of the respective belts.

If desired, the belts may be provided with transverse stiffening which are well-known in the art.

In the illustrated embodiment, shaft 40 comprises a power input shaft and shaft 34 comprises a power output shaft, it being obvious to those skilled in the art that the reverse arrangement may be utilized within the scope of the invention. Similarly, as will be obvious to those skilled in the art, the second pulley 14 may comprise a pulley similar to first pulley 13 to provide further facilitated adjustment of the speed of the drive.

In addition to the resilient retention of sheave 20 against rotation on the shaft 40, springs 42 and 43 permit the sheaves 18 and 19 to vary the spacing therebetween as a function of the force acting longitudinally on the belt, tending to urge the belt radially inwardly toward shaft 40, the variable spacing being shown in broken lines in FIG. 1.

Thus, the improved power transmission apparatus 10 provides for facilitated adjustment of the drive speed with high load transmission capabilities. The invention utilizes a pair of belts with concurrent reduced transverse loading thereon in effecting the power transmission, and while maintaining the center plane of the belts substantially fixed, thereby avoiding the disadvantages of the structures of the prior art.

The foregoing disclosure of specific embodiments is illustrative of the broad inventive concepts comprehended by the invention.

We claim:

1. Power transmission apparatus comprising:
    a pair of looped drive belts defining a longitudinal center plane, each belt having a first planar side surface extending substantially parallel to said belt center plane and an opposite planar side surface extending angularly to said belt center plane;
    a variable speed pulley for power transfer relative to said belts about a rotation axis, said pulley including a pair of axially outer sheaves defining axially inner conical surfaces, and an intermediate sheave defining axially outwardly facing substantially planar opposite surfaces confronting one each said conical surfaces of said outer sheaves;
    means for urging said outer sheaves concurrently coaxially inwardly with accurately equal forces toward the intermediate sheave with the drive belts received therebetween with their opposite side surfaces disposed in facial engagement with the confronting complimentary respective conical and planar surfaces of the sheaves; and
    a second pulley engaged by said belts remotely of said variable speed pulley.

2. The power transmission apparatus of claim 1 wherein said urging means comprises fluid pressure means for applying said equal inwardly urging forces to said outer sheaves.

3. The power transmission apparatus of claim 1 wherein said second pulley comprises a variable speed pulley.

4. The power transmission apparatus of claim 1 wherein said second pulley comprises a variable pulley having a pair of coaxial outer sheaves, an intermediate sheave, and means for biasing said outer sheaves inwardly toward said intermediate sheave.

5. The power transmission apparatus of claim 1 wherein said second pulley comprises a variable pulley having a pair of coaxial outer sheaves, an intermediate sheave, and spring means for biasing said outer sheaves inwardly toward said intermediate sheave.

6. The power transmission apparatus of claim 1 wherein said second pulley includes a pair of axially outer sheaves defining axially inner conical surfaces, and an intermediate sheave defining axially outwardly facing substantially planar opposite surfaces confronting one each said conical surface of said outer sheaves, means for urging said outer sheaves concurrently coaxially inwardly toward the intermediate sheave with the drive belts received therebetween with their opposite side surfaces disposed in facial engagement with the confronting complimentary respective conical and planar surfaces of the sheaves, the angularity of said surfaces of said second pulley sheaves being substantially the same as that of the surfaces of the sheaves of said first named pulley.

7. The power transmission apparatus of claim 1 wherein the angle of said angularly extending side surface of the belts to said belt outer plane is in the range of approximately 5° to 30°.

8. The power transmission apparatus of claim 1 wherein said substantially perpendicular face of the belt extends at an angle to said belt center plane in the range of approximately 0° to 5° whereby the belt is asymmetrically wedge-shaped.

9. A belt drive apparatus comprising:
    a pair of variable speed belt drive pulleys, each pulley comprising a pair of coaxially slidable, opposed sheaves mounted for movement over a predetermined range in an axial direction;
    a stationary sheave having fixedly associated opposite sidewalls extending substantially perpendicular to the pulley axis and disposed intermediate the slidable sheaves; and
    a pair of belts each having an asymmetrical cross section and being engaged between said slidable and stationary sheaves.

10. The belt driving device of claim 9 wherein said variable speed pulleys comprise a pair of coaxially slidable sheaves, a stopper secured to the sleeve and a spring between the stopper and slidable sheaves, said stopper comprising means for preventing displacement of the spring thereat circumferentially about the sleeve.

11. The belt driving device of claim 9 wherein said slidable sheaves define hub portions and said variable speed pulleys further include means for storing pressure fluid in said hub portions, and means for equalizing the pressure in said pressure fluid storing means.

12. The belt driving device of claim 9 wherein the sides of said asymmetrical cross section belts fully facially engage complementary oblique surfaces of said sheaves.

13. The belt driving device of claim 9 wherein each belt defines one side surface having an angularity to the longitudinal center plane of the belt in the range of approximately 15° to 30° thereto and a second, opposite side surface having an angularity to the longitudinal center plane of the belt in the range of approximately 0° to 5° thereto.

14. A variable speed power transmission belt drive pulley comprising:

a pair of coaxial outer sheaves defining axially inner conical surfaces;

an inner sheave coaxially intermediate said outer sheaves and defining axially outer facing substantially planar surfaces; and means for applying accurately equal selectively adjusted forces to said outer sheaves urging them inwardly toward said intermediate sheave, said means for applying said adjustable forces comprising fluid pressure means including means for transmitting fluid pressure between said sheaves.

15. The variable speed pulley of claim 14 wherein said means for transmitting fluid pressure further defines means for maintaining said sheaves in angular alignment about the axis thereof.

16. The variable speed pulley of claim 14 wherein said means for transmitting fluid pressure further defines means for maintaining said sheaves in angular alignment about the axis thereof comprising at least one tubular element slidably connected between said sheaves.

* * * * *